United States Patent [19]
Harbarth et al.

[11] 3,954,237
[45] May 4, 1976

[54] CABLE RACEWAY FOR ELECTRIC LINES

[75] Inventors: Martin Harbarth, Darmstadt; Ewald Steiner, Allmannshausen; Franz Dolansky, Munich, all of Germany

[73] Assignee: Siemens Altiengesellschaft, Berlin & Munich, Germany

[22] Filed: July 24, 1974

[21] Appl. No.: 491,372

[30]   Foreign Application Priority Data
July 30, 1973   Germany............................ 2338586

[52] U.S. Cl................................. 248/68 R; 248/49
[51] Int. Cl.².......................................... F16L 3/22
[58] Field of Search............ 248/49, 68 R; 174/68 C, 174/72 A; 317/122; 179/98; 29/203 MW; 254/134.3 R, 134.3 CL, 134.3 FT, 134.3 PA, 134.3 SC; 226/196, 198; 53/255, 390

[56]         References Cited
           UNITED STATES PATENTS
1,764,630   6/1930   Houts.................................... 248/49
1,995,340   3/1935   Buxton.......................... 254/134.3 R
2,900,170   8/1959   Synstegard.................... 254/134.3 R
3,217,461   11/1965  Wheelock........................... 53/390 X
3,627,300   12/1971  Caveney et al. ............. 248/68 R X FOREIGN PATENTS OR APPLICATIONS
1,937,816   2/1971   Germany............................ 174/68 C
272,392   12/1950   Switzerland....................... 248/68 R

*Primary Examiner*—Roy D. Frazier
*Assistant Examiner*—Rodney H. Bonck

[57]        ABSTRACT

A cable raceway for electric or communication lines, or the like, is described. The raceway is defined by sidewalls, which are freely projecting walls or pins, and a base member. A guiding member is provided for at least a portion of the raceways in a system of them. The guiding members extend over the others of the raceways to prevent lines from inadvertently being placed in them and to guide these lines into the portion of the raceways associated with the guiding members.

5 Claims, 1 Drawing Figure

U.S. Patent May 4, 1976 3,954,237
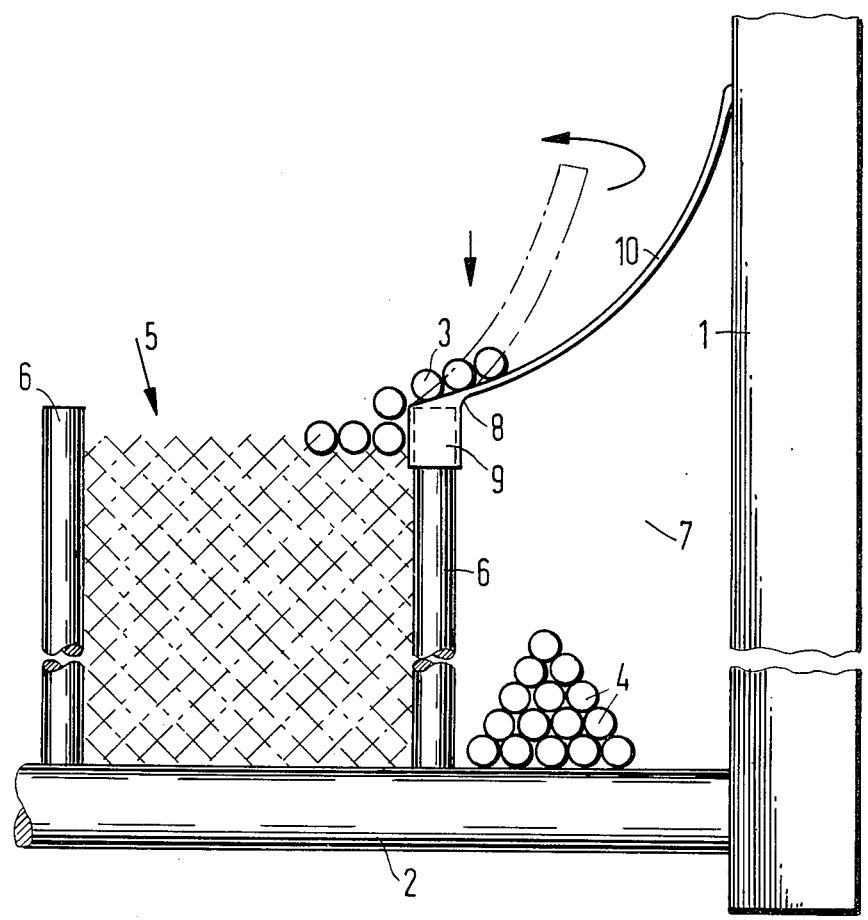

CABLE RACEWAY FOR ELECTRIC LINES

BACKGROUND OF THE INVENTION

The invention relates to a cable raceway for electric lines opening toward one side and otherwise defined by base portions and by freely projecting walls and/or pins.

Because of efforts to achieve miniaturization of the functional components of electrical installations, particularly in the field of communication engineering and in such things as distribution stations for telecommunications, it is necessary to use a very high density of the wiring leading to or from the functional components. Grave problems arise if, for reasons of installation and servicing, it is required that the wiring of such electrical equipment be clearly arranged and subdivided, the available wiring space be fully utilized in an orderly and predetermined fashion, and a conversion of the wiring arrangement, such as for performing jumpering operations in distribution systems, be possible at any time and without interference.

A commonly used technique is to subdivide that portion of a distribution frame available for wiring purposes into individual cable raceways by securing freely projecting pins to horizontal frame bars arranged in tiers which, in association with the frame bars as base portions, define the cable raceways laterally or demarcate from immediately adjacent other cable raceways (see, for example, West German published patent application No. 2,148,659). Admittedly, an accurate subdivision of the available wiring space is achieved, by this means. However, in practice relatively high demands are made upon the attention and expertise of the installer, such as when inserting large quantities of wires in certain cable raceways difficult of access or when deflecting, for example, jumper wires from one raceway to another. Not infrequently, when performing jumpering operations, individual jumper wires fall into the wrong (e.g. the immediately adjacent) jumpering channel in cases where the wiring is close, thus rendering subsequent service difficult.

An object of this invention is to design a cable raceway of the type mentioned hereinabove such that even in places of extremely close wiring the wiring operations can proceed smoothly and yet consistently accurately and systematically.

SUMMARY OF THE INVENTION

In accordance with the invention, the foregoing and other objects are achieved in a cable raceway in which the walls or the pins have at their free ends guiding means leading obliquely to the raceway.

The guiding means may be constructed as elongated sheet-metal parts or sheet-metal combs when the cable raceway is defined by a traversing wall, or when pins are used to demarcate the cable raceway as obliquely squared off pin ends or, as will be more fully explained hereinbelow, as special plastic or metal parts releasably connected with the pins. The guiding means enlarge the cable raceway such that the cross section of adjacent cable raceways is not impaired. Further, they ensure that even electric lines which fall into places that are difficult of access, for example, slightly outside the cable raceway area, due to careless insertion of lines, are caught by the obliquely extending guiding means and caused to slide into the cable raceway area. The guiding means are preferably arranged in places having a comparatively high packing density. In so doing, they prevent individual lines from falling out of the fully occupied cable raceway and interfering with operations, for example, in an adjacent cable raceway. The guiding means referenced above are preferably mounted in cable raceways which are systematically occupied by a great many lines and which are particularly provided for wiring requiring frequent conversion, such as for jumper wires of an electrical distribution system.

A further development of the invention is characterized in that the guiding means skip, at least partially, another cable raceway adjacent the [first] cable raceway, and that they are movably constructed so as to enable free access to the other cable raceway. Thus, the first cable raceway can be distinguished clearly and visually from the other cable raceway which, for example, is provided for the wiring of special lines for less frequent conversions and for lines of special cross-connections in distribution substations or the like. Provisions are made that when wiring operations shall be performed in the other cable raceway, it, too, can be fully opened and made accessible through elimination of the movable guiding means.

When freely projecting pins are employed as limiting means for cable raceways, very advantageous developments of the invention are achieved in that the guiding means mounted on the free ends of pins are rotatable about the pin axis. Each guiding means is provided with a bushing and can be mounted on the free end of the associated pin. The guiding means may also be mounted subsequently on the corresponding pins in places with extremely high wiring density. If jumpering operations are to be performed in the other cable raceway referenced above, the guiding means are simply turned 90 degrees, after which the other cable raceway is freely accessible.

According to a further development of the invention, the guiding means is of such length that it overlaps the entire width of an adjacent other cable raceway and can be supported against a limiting means of the cable raceway. In many cases, a vertical frame bar is offered as a limiting means for the other cable raceway and as a support for the guiding means.

BRIEF DESCRIPTION OF THE DRAWING

The principles of the invention will be more readily understood by reference to the description of a preferred embodiment given hereinbelow in conjunction with the single FIGURE drawing which is a side elevation of a cable raceway for electric lines constructed according to the invention.

DETAILED DESCRIPTION OF THE DRAWING

The drawing shows a side view of a section of a distribution frame of the type employed in communication engineering, wherein a vertical frame bar 1 runs through the entire height of the distribution frame. A horizontal bracket 2 is secured to the vertical frame bar 1. A distributor component of known construction may be secured to the free end (not shown) of the bracket 2 for electrically connecting lines coming into the distribution frame to lines going out therefrom, and known as jumper wires 3. A horizontal cable raceway 5, open toward one side, and otherwise defined downwardly by the bracket 2 used as a base section and laterally by vertical, freely projecting round cross section pins 6, is used for the orderly wiring of the jumper lines. The wiring laid in the cable raceway 5 is shown in the drawing by intersecting trunk routes and by several lines 3. Another cable raceway 7 is provided between the frame bar 1 and the adjacent pin 6 for electric lines associated with special services, special cross-connections, etc.

A guiding means made of elastomeric plastic and labeled 8 has a bushing 9, as well as a shoulder 10 of circular arc form. The inside diameter of the bushing 9 is so designed that the guiding means, when pressed tightly against the free end of the pin 6, can be rotated relatively easily about the pin axis, for example, to the position shown in broken line. It is apparent from the FIGURE that the shoulder 10 of the guiding means 8 extends across the entire width of the cable raceway 7 and that the end thereof is resiliently urged against the frame bar 1.

As shown in the drawing, jumper lines 3 incoming even outside the cable raceway 5, for example, in the direction of the arrow, strike against the curved guiding means 8 and slide into the cable raceway 5, jumper lines 3 cannot fall out of the fully occupied cable raceway 5 into the adjacent cable raceway 7.

If wiring operations are to be carried out in the cable raceway 7, the guiding means 8 is turned, e.g., 90 degrees in order to open raceway 7 to permit wiring operations to be carried out therein.

The preferred embodiment described hereinabove is intended only to be exemplary of the principles of the invention and is not to be considered as defining its scope. It is contemplated that the described embodiment can be modified or changed in a number of ways, while remaining within the scope of the invention, as defined by the appended claims.

We claim:
1. A cable raceway system for electric or communication lines or the like, comprising:
   a plurality of side by side cable raceways, each of which is defined by a base member and side wall members extending vertically from said base member.
   guiding means extending from alternate ones of said cable raceways for receiving said lines and guiding them therein, said guiding means overlapping and at least partially covering others of said cable raceways adjoining, respectively, said alternate ones of said cable raceways, said guiding means being moveably connected to ones of said side wall members to permit uncovering of said other cable raceways.
2. The cable raceway system defined in claim 1 wherein said guiding means are of a length as to completely overlap and cover said other cable raceways.
3. The cable raceway system defined in claim 1 wherein said guiding means is arcuate in shape for receiving lines in the concave portion thereof.
4. The cable raceway system defined in claim 1 wherein said side wall members are formed by pin means.
5. The cable raceway system defined in claim 4 wherein said guiding means are connected to said pin means in such manner as to be pivotable about the axes of said pin means.

* * * * *